United States Patent
Izumi et al.

(10) Patent No.: US 10,549,235 B2
(45) Date of Patent: Feb. 4, 2020

(54) OZONE OXIDATION DECOMPOSITION TREATMENT METHOD FOR VOCS AND/OR GASEOUS INORGANIC REDUCING COMPOUNDS IN GAS

(71) Applicants: FUTAMURA KAGAKU KABUSHIKI KAISHA, Aichi (JP); DAINICHISEIKA COLOR & CHEMICALS MFG. CO., LTD., Tokyo (JP)

(72) Inventors: Jun Izumi, Nagasaki (JP); Kaori Fukahori, Nagasaki (JP); Toru Kawakami, Tokyo (JP); Akira Nishio, Tokyo (JP)

(73) Assignees: FUTAMURA KAGAKU KABUSHIKI KAISHA, Aichi (JP); DAINICHISEIKA COLOR & CHEMICAL MFG. CO., LTD., Tokyo (JP)

(*) Notice: Subject to any disclaimer, the term of this patent is extended or adjusted under 35 U.S.C. 154(b) by 0 days.

(21) Appl. No.: 15/761,512

(22) PCT Filed: Feb. 4, 2016

(86) PCT No.: PCT/JP2016/053424
§ 371 (c)(1),
(2) Date: Mar. 20, 2018

(87) PCT Pub. No.: WO2017/056517
PCT Pub. Date: Apr. 6, 2017

(65) Prior Publication Data
US 2018/0264405 A1      Sep. 20, 2018

(30) Foreign Application Priority Data
Sep. 30, 2015 (JP) .................. 2015-194359

(51) Int. Cl.
*B01D 53/82* (2006.01)
*B01D 53/44* (2006.01)
(Continued)

(52) U.S. Cl.
CPC ............. *B01D 53/82* (2013.01); *B01D 53/44* (2013.01); *B01D 53/52* (2013.01); *B01D 53/58* (2013.01);
(Continued)

(58) Field of Classification Search
None
See application file for complete search history.

(56) References Cited

U.S. PATENT DOCUMENTS

| 4,040,982 A | 8/1977 | Basila et al. |
| 6,403,031 B1 | 6/2002 | Escude et al. |

(Continued)

FOREIGN PATENT DOCUMENTS

| CN | 1894029 | 1/2007 |
| CN | 101522572 | 9/2009 |

(Continued)

OTHER PUBLICATIONS

International Search Report, issued in the corresponding PCT application No. PCT/JP2016/053424, dated Apr. 19, 2016, 5 pages.

(Continued)

*Primary Examiner* — Daniel Berns
(74) *Attorney, Agent, or Firm* — Hamre, Schumann, Mueller & Larson, P.C.

(57) ABSTRACT

The present invention provides a method for performing a decomposition treatment on a VOC and/or a gas-phase inorganic reducing compound in a gas through ozone oxidation, by which further enhancement of efficiency in oxidative decomposition reaction by ozone is achieved, a decomposition treatment can be performed efficiently on a (Continued)

high-flow rate exhaust gas containing substances such as a VOC and a malodorous substance in low concentrations, and the amount of ozone to be used can be reduced in a method for performing oxidative decomposition treatment with ozone on a VOC and the like using a high silica adsorbent. The present invention is a method for performing an oxidative decomposition treatment with ozone on a VOC and/or a gas-phase inorganic reducing compound in a gas, the method including adding/mixing an ozone gas into a gas containing a VOC and the like, and then bringing a resultant mixed gas into contact with a high silica adsorbent being a packed porous body to perform decomposition treatment on the VOC and the like through ozone oxidation, wherein a porous body including the high silica adsorbent as a base material, and a particulate powder of a transition metal-containing oxide having a BET specific surface area of 80 m$^2$ or more, the particulate powder carried on the base material, is used as a packing material.

7 Claims, 1 Drawing Sheet

(51) Int. Cl.

| | | |
|---|---|---|
| B01D 53/52 | (2006.01) | |
| B01D 53/58 | (2006.01) | |
| B01D 53/62 | (2006.01) | |
| B01D 53/72 | (2006.01) | |
| B01J 20/06 | (2006.01) | |
| B01J 20/10 | (2006.01) | |
| B01J 20/28 | (2006.01) | |
| B01J 20/30 | (2006.01) | |

(52) U.S. Cl.
CPC ............ *B01D 53/62* (2013.01); *B01D 53/72* (2013.01); *B01J 20/06* (2013.01); *B01J 20/103* (2013.01); *B01J 20/28* (2013.01); *B01J 20/28059* (2013.01); *B01J 20/30* (2013.01); *B01D 2251/104* (2013.01); *B01D 2253/106* (2013.01); *B01D 2253/108* (2013.01); *B01D 2253/1124* (2013.01); *B01D 2253/25* (2013.01); *B01D 2253/306* (2013.01); *B01D 2257/304* (2013.01); *B01D 2257/306* (2013.01); *B01D 2257/40* (2013.01); *B01D 2257/406* (2013.01); *B01D 2257/502* (2013.01); *B01D 2257/708* (2013.01)

(56) References Cited

U.S. PATENT DOCUMENTS

| | | | |
|---|---|---|---|
| 6,503,469 B2 | 1/2003 | Izumi et al. | |
| 6,533,999 B1* | 3/2003 | Izumi | B01D 53/04 422/24 |
| 7,833,316 B2 | 11/2010 | Tatarchuck et al. | |
| 2004/0175318 A1* | 9/2004 | Segawa | A61L 9/015 423/247 |
| 2007/0020171 A1 | 1/2007 | Waki et al. | |
| 2007/0128424 A1 | 6/2007 | Omori et al. | |
| 2008/0008937 A1 | 1/2008 | Eylem et al. | |
| 2009/0261042 A1 | 10/2009 | Semiat et al. | |
| 2010/0254868 A1 | 10/2010 | Obee et al. | |
| 2012/0024799 A1 | 2/2012 | Chen et al. | |
| 2014/0065047 A1 | 3/2014 | Hui et al. | |

FOREIGN PATENT DOCUMENTS

| | | | |
|---|---|---|---|
| EP | 0625482 | 11/1994 | |
| EP | 0913193 | 5/1999 | |
| JP | 07-318036 | 12/1995 | |
| JP | 09-056799 | 3/1997 | |
| JP | H09-056799 | * 3/1997 | ............... A61L 9/01 |
| JP | 09-299756 | 11/1997 | |
| JP | 11-104618 | 4/1999 | |
| JP | 11-342313 | 12/1999 | |
| JP | 2000-005563 | 1/2000 | |
| JP | 2000-005743 | 1/2000 | |
| JP | 2000-153152 | 6/2000 | |
| JP | 2001-149958 | 6/2001 | |
| JP | 2002-263439 | 9/2002 | |
| JP | 3377733 | 2/2003 | |
| JP | 3382854 | 3/2003 | |
| JP | 3382857 | 3/2003 | |
| JP | 3611278 | 1/2005 | |
| JP | 2005-342555 | 12/2005 | |
| JP | 2007-125509 | 5/2007 | |
| JP | 2007-222697 | 9/2007 | |
| JP | 2008-055312 | 3/2008 | |
| JP | 2008-284520 | 11/2008 | |
| JP | 2009-297629 | 12/2009 | |
| JP | 2010-094633 | 4/2010 | |
| JP | 2011-078885 | 4/2011 | |
| JP | 2011-078886 | 4/2011 | |
| JP | 2011-246799 | 12/2011 | |
| JP | 2011-246800 | 12/2011 | |
| JP | 5113891 | 1/2013 | |
| JP | 5113892 | 1/2013 | |
| JP | 2014-210251 | 11/2014 | |
| JP | 2015-174017 | 10/2015 | |
| JP | 2015-188823 | 11/2015 | |
| KR | 10-2006-0103447 | 9/2006 | |
| WO | 2005/056175 | 6/2005 | |
| WO | 2008/001354 | 1/2008 | |

OTHER PUBLICATIONS

Extended European Search Report, issued in the corresponding European patent application No. 16850695.4, dated Dec. 17, 2018, 6 pages.
Korean Office Action, issued in the corresponding Korean patent application No. 10-2018-7008563, dated Feb. 22, 2019, 14 pages with machine translation.
International Search Report, issued in the corresponding PCT application No. PCT/JP2016/053425, dated Mar. 1, 2016, 4 pages.
Korean Office Action, issued in the corresponding Korean patent application No. 10-2018-7008566, dated Jan. 24, 2019, 18 pages with machine translation.
U.S. Appl. No. 15/764,012, filed Mar. 28, 2018, 2018/0280922.
Extended European Search Report, issued in the related European patent application No. 16850696.2, dated Mar. 22, 2019, 13 pages.
Hu et al., "Catalytic Ozonation of Herbicide 2,4-D over Cobalt Oxide Supported on Mesoporous Zirconia", Journal of Physical Chemistry C, vol. 112, No. 15, pp. 5978-5983, Apr. 1, 2008.
Taiwanese Office Action, issued in the corresponding Taiwanese patent application No. 105104593 , dated Jun. 19, 2019,12 pages.
Japanese Office Action, issued in the related Japanese patent application No. 2015-194360, dated Aug. 6, 2019, 67 pages (including full machine translations of the Office Action and the cited four japanese patent references), the four Japanese patent references with English abstract and WO 20051056175 and US patent document corresponding to WO '175 being previously submitted.
Japanese Office Action, issued in the corresponding Japanese patent application No. 2015-194359, dated Oct. 3, 2019, 8 pages.
Konova et al., "Catalytic oxidation of VOCs and CO by ozone over alumina supported cobalt oxide", Applied Catalysis A General, Elsevier, vol. 298, pp. 109-114, 2006.
Second Korean Office Action, issued in the corresponding Korean patent application No. 10-2018-7008563, dated Sep. 5, 2019,11 pages (including translation), the cited references being previously filed in the IDS.
European Office Action, issued in the corresponding European patent application No. 16 850 695.4, dated Sep. 12, 2019, 5 pages,

(56) References Cited

OTHER PUBLICATIONS the cited references being previously filed in the IDS on Mar. 20, 2018.

* cited by examiner

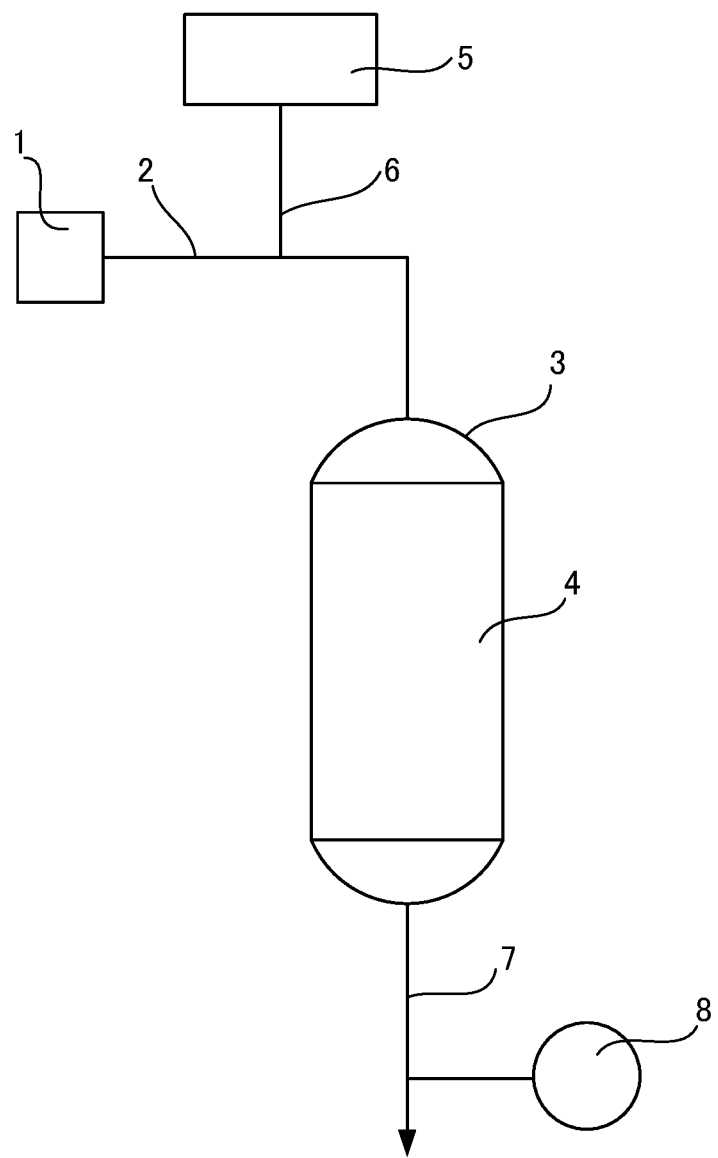

OZONE OXIDATION DECOMPOSITION TREATMENT METHOD FOR VOCS AND/OR GASEOUS INORGANIC REDUCING COMPOUNDS IN GAS

TECHNICAL FIELD

The present invention relates to a method for performing treatment on a VOC and/or a gas-phase inorganic reducing compound in a gas by decomposition through ozone oxidation. More specifically, in performing a treatment of volatile organic compounds (VOCs) for which the emission regulation is being strengthened by Air Pollution Control Act, a treatment of malodorous components for which the emission regulation is being strengthened by Offensive Odor Control Act, and a removal of various components, such as ethylene, aldehyde, and terpene, which are mixed in a gas inside of a preservation warehouse for agricultural crops, the removal being desired for keeping freshness of the agricultural crops, the present invention relates to a method for performing an oxidative decomposition treatment with ozone on a VOC and a malodorous component in a highly efficient manner by outstandingly accelerating an oxidation reaction of the VOC by ozone in the case where these VOCs, malodorous components, and the above-described various components are subjected to oxidative decomposition by ozone.

BACKGROUND ART

For example, in treatments of an exhaust gas containing VOCs (such as volatile alcohols, ketones, esters, ethers, aldehydes, and aromatic compounds), a method of honeycomb rotor TSA (temperature swing adsorption method)+catalytic combustion method is most frequently adopted. In this method, the VOCs contained in an exhaust gas are supplied into an adsorption bed packed with a high silica zeolite to be adsorbed and removed, a high-temperature hot blast is supplied into the adsorption bed of the high silica zeolite to which the VOCs are adsorbed to detach the VOCs at a high temperature, the VOCs are concentrated by volume reduction, and the detached/concentrated VOCs are subjected to oxidative decomposition through catalytic combustion. In addition, the treatments that are expected to be wide-spread in the future include a Packed Bed Plasma VOC Treatment, which is proposed by U.S. Environmental Agency, in which life-prolonging discharge is performed at a surface of a ferroelectric substance in a packed bed packed with the ferroelectric substance (such as barium titanate), and a VOC-containing gas is then supplied into the packed bed to perform oxidative decomposition. These methods show constant performance in the treatments of the VOCs, but in the method of honeycomb rotor+catalytic combustion, there is a limit to cost reduction due to the complexity of apparatuses and the complexity of operations, and in the Packed Bed Plasma VOC Treatment, there is a limit to the VOC removal rate, so that there is concern that these methods will not be able to conform to the emission regulations for the VOCs and malodorous components in the future.

On the other hand, performing oxidative decomposition of the VOCs through homogeneous gas phase reaction by adding an ozone gas to a gas containing contamination components such as the VOCs and the malodorous components (hereinafter, description will be made taking the VOCs as a representative example) is also possible. However, such oxidative decomposition has not been put into practical use yet because the ozone oxidation reaction of the VOCs in low concentrations is slow; the treatment of unreacted ozone is complex; and the production cost of ozone that is used as an oxidizing agent is expensive. In addition, there is proposed a method in which a high silica adsorbent co-adsorbing the VOCs and ozone is used as a packing material for improving the reaction efficiency in the ozone oxidation, thereby achieving enhancement of efficiency in the oxidation reaction of the VOCs by ozone in a crystal of the high silica adsorbent which has co-adsorbed the VOCs and ozone (see Patent Literatures 1 and 2, and the like).

CITATION LIST

Patent Literature

Patent Literature 1: Japanese Patent No. 3382854
Patent Literature 2: Japanese Patent No. 3382857

SUMMARY OF INVENTION

Technical Problem

However, according to the method proposed in Patent Literatures 1 and 2, and the like, the enhancement of efficiency in the ozone reaction of the VOCs is realized, but further enhancement of efficiency is required for putting the method into practical use. Further, in the conventional methods, there is a risk that the oxidative decomposition reaction of the VOCs is terminated in the middle of the reaction to produce an organic acid resulting in an odorous component, and in that case, there is also a problem that this organic acid accumulates on the zeolite crystal to lower the reaction rate of the ozone oxidation reaction, and therefore improvements for performing the oxidative decomposition of the VOCs by ozone further efficiently and sufficiently are desired.

Accordingly, an object of the present invention is to provide a method for performing decomposition treatment on a VOC and/or a gas-phase inorganic reducing compound in a gas through ozone oxidation, by which further enhancement of efficiency in oxidative decomposition reaction by ozone is achieved, decomposition treatment can be performed efficiently on a substance as an object of the treatment, such as the VOC, even in a high-flow rate exhaust gas containing the VOC and the like in low concentrations, and the amount of ozone to be used can be reduced in a method for performing an oxidative decomposition treatment with ozone using the above-described high silica adsorbent as a packing material to co-adsorb a substance as an object of the treatment, such as the VOC, and ozone.

Solution to Problem

The above-described object is achieved by the present invention. That is, the present invention provides a method for performing an oxidative decomposition treatment with ozone on a VOC and/or a gas-phase inorganic reducing compound in a gas, the method comprising adding/mixing an ozone gas into a gas comprising as components being objects of the treatment a VOC and/or a gas-phase inorganic reducing compound, and then bringing a resultant mixed gas into contact with a packing material comprising as a base material a high silica adsorbent co-adsorbing the components being the objects of the treatment and ozone to perform decomposition treatment on the VOC and/or the gas-phase inorganic reducing compound through ozone oxidation, wherein the packing material is obtained by carrying a particulate powder of a transition metal-containing oxide having a BET specific surface area of 80 m$^2$/g or more on the base material.

Preferred embodiments of the method for performing an oxidative decomposition treatment with ozone on a VOC and/or a gas-phase inorganic reducing compound in a gas according to the present invention include the following. The transition metal-containing oxide is an oxide of at least one selected from the group consisting of Co, Mn, and Cu, or a complex oxide of two or more selected from the group consisting of Co, Mn, and Cu; the transition metal-containing oxide is a complex oxide of Co, Mn, and Cu, or an oxide of Co; the particulate powder of the transition metal-containing oxide is formed using a precipitate obtained through coprecipitation performed by mixing an aqueous solution of a salt of at least one metal selected from Co, Mn, and Cu, or a mixed aqueous solution of two or more metal salts the metals of which are selected from Co, Mn, and Cu with an aqueous alkaline solution; when an exhaust gas comprising the VOC and/or the gas-phase inorganic reducing compound is brought into contact with ozone, a concentration ratio of a concentration of ozone injected into the exhaust gas to a concentration of the VOC and/or the gas-phase inorganic reducing compound (in terms of C1) in the exhaust gas is constituted to exceed 0.8; the BET specific surface area is 100 m$^2$/g or more; the high silica adsorbent comprises any material selected from the group consisting of a high silica pentasil zeolite, a dealuminized faujasite, and a mesoporous silicate; and the VOC and/or the gas-phase inorganic reducing compound is at least one selected from the group consisting of ammonia, methyl mercaptan, hydrogen sulfide, methyl sulfide, trimethylamine, acetaldehyde, propionaldehyde, normal butyraldehyde, isobutyraldehyde, normal valeraldehyde, isovaleraldehyde, isobutanol, ethyl acetate, methyl isobutyl ketone, toluene, styrene, xylene, cyclohexanone, propionic acid, normal butyric acid, normal valeric acid, isovaleric acid, and carbon monoxide.

Advantageous Effects of Invention

The present inventors have obtained new findings described below in conducting an ozone-VOC oxidation reaction in a gas phase, and have thereby completed the present invention. The present inventors have found that when an adsorbent being a porous body comprising a high silica zeolite or the like co-adsorbing a VOC component as an object of treatment and ozone, the porous body being used in conventional techniques, is used as a base material; and a particulate powder of a transition metal-containing oxide having a BET specific surface area of 80 m$^2$/g or more is carried on the base material to use as a packing material in the reaction system, the ozone gas injected into a gas as an object of the treatment and VOCs and the like in the gas come into contact, so that the VOCs are oxidized by ozone in a highly efficient manner in a state where the VOCs and ozone are co-adsorbed to the packing material, and on the other hand, unreacted ozone that has not been used in the oxidation reaction is surely converted into oxygen.

It has been ascertained that according to the method for performing an oxidative decomposition treatment with ozone of the present invention having the above-described constitution, the oxidation reaction rate reaches at a level about 10 to about 100 times faster than conventional gas-phase oxidative decomposition reactions by ozone in a system where the oxidative decomposition treatment with ozone is performed after a component as an object of the treatment and ozone are co-adsorbed, and the VOCs and the like are oxidized by ozone in a highly efficient manner. It is considered that this is brought about by the reason described below. Firstly, the ozone gas in a gas phase frequently decomposes without contributing to oxidative decomposition due to collision with a third substance other than the VOC components in the gas phase, and therefore the efficiency in the decomposition of the VOCs does not become so high. On the other hand, it is inferred that, in the oxidation reaction between ozone and the VOC components in a porous packing material capable of co-adsorbing ozone and the VOCs, the porous packing material constituting the present invention, a fine particle of a transition metal-containing oxide having a high BET specific surface area, as high as 80 m$^2$/g or more, the fine particle characterizing the present invention, exists and gets into an oxidation state by ozone, and the VOCs, when diffused to reach the fine particle, reduce the transition metal in the oxidation state, that is, the VOCs are oxidized to make the oxidation-reduction reaction progress, so that a high efficiency in the decomposition treatment can be achieved. Further, the amount of ozone to be consumed for this efficient oxidation of the VOCs by ozone is greatly reduced when compared to the above-described gas-phase reactions between ozone and the VOCs in the conventional techniques, and a remarkable increase in the reaction rate is achieved. These are not disclosed at all in the findings on the ozone oxidation reaction of contamination components in the conventional techniques. According to studies conducted by the present inventors, the amount of ozone required in the oxidative decomposition treatment with ozone for the VOCs and the malodorous substances in an exhaust gas or the like can be reduced greatly by constituting the oxidative decomposition treatment with ozone as described above. As a result, the above-described oxidation reaction by ozone is accelerated, and on top of that, the amount of expensive ozone to be used can be reduced, and further, the amount of unreacted ozone can be reduced, so that the above-described constitution can greatly contribute to putting the oxidative decomposition treatment with ozone into practical use.

BRIEF DESCRIPTION OF DRAWINGS

FIG. 1 shows a schematic diagram illustrating a flow of one embodiment for carrying out a method according to the present invention.

DESCRIPTION OF EMBODIMENTS

The present invention will be described in detail giving preferred embodiments according to the present invention. FIG. 1 shows a schematic outline diagram of one embodiment for carrying out a method according to the present invention. The present invention will be described in detail with reference to this figure. As one example, an oxidative decomposition treatment with ozone is performed with an apparatus in FIG. 1 using an exhaust gas containing MEK (methyl ethyl ketone) as a VOC. This exhaust gas 1 is supplied into a packed bed 3 through a flow channel 2 illustrated in FIG. 1 to perform the treatment, wherein the packed bed 3 is packed with a porous body comprising: as a base material a high silica adsorbent co-adsorbing MEK and ozone, the high silica adsorbent being a porous body; and a particulate powder of a transition metal-containing oxide having a BET specific surface area of 80 m$^2$/g or more, the particulate powder carried on the base material (hereinafter, also referred to as "transition metal fine particle-carrying porous body" or "porous body"). In this test, an ultrafine particulate complex oxide comprising three kinds of metals of Co, Mn, and Cu; and an ultrafine particulate oxide of Co are used as the particulate powder of a transition metal-containing oxide. In the present invention, regardless of what is described above, another oxide of at least one selected from the group consisting of Co, Mn, and Cu, or another complex oxide of two or more selected from the group consisting of Co, Mn, and Cu can be used as the transition metal-containing oxide.

The above-described transition metal-containing, ultrafine particle-shaped oxide to be utilized suitably in the present invention is preferably prepared by the wet coprecipitation method described below. For example, the ultrafine particle-shaped complex oxide comprising three kinds of metals of Co, Mn, and Cu can be obtained easily in the manner as described below. Firstly, an aqueous solution of a salt of Co, of a salt of Mn, and of a salt of Cu, and an aqueous solution of an alkali such as caustic soda are prepared, and these are dropped into an aqueous medium to deposit a coprecipitate of the three kinds of metals. Subsequently, the obtained coprecipitate is subjected to filtration, washed with water, dried, and is then subjected to a heat treatment in a range of 100 to 500° C. to obtain the intended ultrafine particulate oxide containing Co, Mn, and Cu. The particle diameter of the fine particle thus obtained is extremely small, as small as about 0.02 to about 0.1 μm, and the BET specific surface area thereof becomes 80 $m^2$/g or more, or further, 100 $m^2$/g or more.

As the salt of each metal to be used in this case, any of commercially available metal salts can be used, and sulfates, nitrates, chlorides, and the like can be used. In addition, as the alkali to be used, general alkalis such as caustic soda, soda ash, and sodium bicarbonate can be used. With respect to the ratio of each metal to be mixed, a range of 40 mol % or less for Co, a range of 30 to 70 mol % for Mn, and a range of 25 to 45 mol % for Cu are suitable in terms of a molar ratio relative to the total moles of respective metals. In addition, with respect to the concentration of the aqueous solution of each metal salt, a range of approximately 5 to approximately 50% by mass is suitable. According to the studies conducted by the present inventors, with respect to the precipitation condition, when the precipitation pH is adjusted in a pH range where the transition metals precipitate, a fine precipitate can be deposited. The pH may be adjusted in a range of a pH of approximately 5 to approximately 14, suitably in a range of a pH of 9 to 13. The shape of the obtained precipitate is close to an amorphous shape, but a heat treatment is needed in order to make the properties more stable, and the heat treatment may preferably be performed in a range of 100 to 500° C., more preferably in a range of 100 to 300° C. When the heat treatment temperature during the treatment is too high, the specific surface area is decreased, so that the transition metal-containing, ultrafine particulate oxide specified in the present invention cannot be obtained. When the BET specific surface area of the transition metal-containing, ultrafine particulate oxide to be carried is less than 80 $m^2$/g, the number of VOC-adsorbing sites is decreased to deteriorate the adsorption property, so that the effect of enhancing the efficiency in the ozone oxidation cannot be obtained.

Further, for example, in the case where the transition metal is only Co, an ultrafine particulate oxide containing Co can be prepared by the wet coprecipitation method basically in the same manner as described above. That is, an aqueous solution of a salt of a metal of Co and an aqueous alkaline solution each prepared in advance are dropped into an aqueous medium to obtain a precipitate of a metal of Co, and the obtained precipitate is subjected to filtration, washed with water, dried, and then subjected to a heat treatment, and thus the intended ultrafine particulate oxide containing Co can be obtained. In this case, the heat treatment is performed by setting the heat treatment temperature in a range of 300 to 800° C., preferably in a range of 400 to 700° C.

The above-described powder of a transition metal-containing oxide for use in the present invention can also be produced by dry-mixing oxides, carbonates, basic carbonates, and oxalates of respective metals in combination, and then firing the resultant mixture when the BET specific surface area of the transition metal-containing oxide is not taken into consideration. However, the mixed raw material of the oxides and the like of the respective metals has a large primary particle diameter, so that the particle diameter of a powder obtained by performing firing after the dry-mixing is limited to sub-micron meters at the smallest, and the powder having a particle diameter of sub-micron meters or less cannot be produced. Therefore, the powder has a specific surface area of about several $m^2$/g and has a small number of adsorption sites, so that an ultrafine particulate powder of a transition metal-containing oxide having a BET specific surface area of 80 $m^2$/g or more specified in the present invention cannot be produced. In contrast, the powder obtained by the above-described wet process is, for example, an ultrafine particle having an average particle diameter of 0.02 to 0.1 μm or having an average particle diameter of about 0.05 μm, and, according to circumstances, a sample having a specific surface area of exceeding 100 $m^2$/g, or further, exceeding 200 $m^2$/g can be made by the above-described wet process, and therefore the powder obtained by the above-described wet process is extremely useful for adsorbing and removing the VOC in an exhaust gas, which is the object of the present invention. The present inventors consider that the reason is as follows; namely, when the VOC or the like being the object of the treatment and ozone are introduced in a packing material, the transition metal fine particle gets into an oxidation state by ozone, and the VOC, when diffused to reach the transition metal fine particle, reduces the transition metal in the oxidation state to be oxidized. Since the transition metal fine particle has a large specific surface area, the above-described oxidation-reduction reaction progresses actively, and as a result, the adsorption and removal of the VOC in the exhaust gas have been performed in a highly efficient manner.

The method of carrying the fine particulate powder of a transition metal-containing oxide obtained in the manner as described above on the base material being a high silica adsorbent being a porous body co-adsorbing the VOC component as an object of treatment and ozone is preferably performed in the manner as described below. It is preferably that using as a base material the high silica adsorbent co-adsorbing a component as an object of treatment and ozone, a slurry containing an ultrafine powder of the transition metal oxide as described above be applied on the surface of the base material, the applied slurry on the base material be then dried and fired to prepare a molded body molded into a monolith according to the shape of a bed to be packed, and the molded body be used as the packing material. The concentration of the slurry is not particularly limited and may be, for example, about 10% by mass. The temperature during drying and firing is 100 to 300° C., preferably, for example, about 250° C. Examples of the base material include a base material that is molded with aluminosilicate comprising as main components Si, Al, and an oxygen atom; that is made of a high silica zeolite being a porous body; and that has a cardboard structure which is obtained, for example, by laminating flat plates and a corrugated plate alternatingly, and which has an interval between the flat plates of 2 mm, an interval between tops of the corrugated plate of 2 mm, and a plate thickness of 0.2 mm. By making the shape of the base material in this way, the chances of the previously-described oxidation-reduction reaction are greatly increased, so that the adsorption and removal of the VOC in an exhaust gas is performed in a more highly efficient manner.

As the high silica zeolite base material being used above and co-adsorbing the component as an object of treatment and ozone, both the high silica zeolite base materials described in Japanese Patent No. 3377733 and described in Japanese Patent No. 3382854 can be used. Specific examples of the high silica zeolite base material include a high silica zeolite base material comprising a high silica pentasil zeolite, a dealuminized faujasite, and a mesoporous silicate and having a cardboard structure as described above.

In the method for performing an oxidative decomposition treatment method with ozone on a VOC and/or a gas-phase inorganic reducing compound according to the present invention, a packing material 4 obtained by carrying the particulate powder of a transition metal-containing oxide prepared in the manner as described above on the base material being a porous body comprising a high silica adsorbent is packed in a bed 3 to be packed, the bed illustrated in FIG. 1, (hereinafter, referred to as packed bed) to perform an oxidative decomposition of the VOC and the like by ozone in the manner as described below.

Numerical reference 1 in FIG. 1 denotes an introduction port for a gas, such as an exhaust gas containing the VOC or the like, which is an object of treatment, and numerical reference 2 in FIG. 1 denotes a flow channel for the exhaust gas. As illustrated in FIG. 1, in the flow channel 2 for the exhaust gas, an ozone gas is injected from an ozone generator 5 into the exhaust gas through a flow channel 6 for ozone to mix the exhaust gas and the ozone gas. Subsequently, this mixed gas is introduced into the packed bed 3, and the oxidative decomposition treatment with ozone is performed on the packing material 4 which is packed. In this case, the mixed gas to be introduced into the packed bed 3 is preferably made to satisfy a ratio of an ozone concentration at an inlet port to the packed bed/a VOC concentration (in terms of C1) at the inlet port of exceeding 0.8. Further, the ratio of 0.9 to 1.3 is sufficient, and, for example, when the ratio is about 1.0, the decomposition can be performed sufficiently and efficiently. According to the studies conducted by the present inventors, it has been found that by adjusting the amount of the exhaust gas to be introduced for performing the treatment, for example, in the manner as described below when specified by an SV value (flow rate of gas to be treated per 1 m$^3$ of packed bed [m$^3$N/h], in units of [1/h]), a high capability of decomposing the VOC is obtained in any cases although the amount of the exhaust gas to be introduced is different depending on the concentration of the VOC contained in the exhaust gas. That is, by adjusting the SV value to be 10000 [1/h] or less for a VOC concentration at the inlet port of 100 ppm (in terms of C1), adjusting the SV value to be 25000 [1/h] or less for a VOC concentration at the inlet port of 10 ppm (in terms of C1), and adjusting the SV value to be 50000 [1/h] or less for a VOC concentration at the inlet port of 1 ppm (in terms of C1), 90% or more of the VOC in the supplied exhaust gas is decomposed.

Examples

Hereinafter, the present invention will be described in more detail giving Examples and Comparative Examples; however, the present invention is not limited by Examples at all.

(Treatment Apparatus and Treatment Conditions)

Exhaust gases each containing MEK as a VOC in a concentration of 25 ppm, 2.5 ppm, and 0.25 ppm were used and supplied into the packed bed 3 through the flow channel 2. Further, when each exhaust gas was supplied, a desired amount of ozone gas was injected into the flow channel 2 to be mixed with the exhaust gas, thereby performing oxidative decomposition treatment with ozone in the packed bed. As abase material for a packing material packed in the packed bed 3, the previously-described base material that is made of a high silica zeolite being a porous body and that has a cardboard structure was used. As the high silica zeolite, an ultra-stable Y-type zeolite (USY) having a $SiO_2/Al_2O_3$ ratio of 100 was used.

Further, a packed material using an ultrafine particulate complex oxide comprising three kinds of metals of Co, Mn, and Cu as a particulate powder of a transition metal-containing oxide to be carried on the base material was used as Sample-A, and a packed material using ultrafine particulate oxide of Co as a particulate powder of a transition metal-containing oxide to be carried on the base material was used as Sample-B. A complex oxide prepared by a wet coprecipitation method in the manner as described below, the complex oxide comprising Co, Mn, and Cu and being an ultrafine particulate powder having a specific surface area of 260 m$^2$/g, was used as the particulate powder of the transition metal-containing oxide to be carried on the base material. In addition, an oxide of Co prepared by a wet coprecipitation method in the manner as described below, the oxide of Co being an ultrafine particulate powder having a specific surface area of 130 m$^2$/g, was used as the particulate powder of the transition metal-containing oxide to be carried on the base material. For comparison, the ultra-stable Y-type zeolite (USY) having a $SiO_2/Al_2O_3$ ratio of 100 was molded into the same shape as the above-described base material for Samples-A and B to bed used as Sample-C being a packing material.

The particulate powder of the complex oxide of Co, Mn, and Cu (composition of Co:Mn:Cu=0.2:0.7:0.4 (molar ratio)) used for Sample-A was prepared in the manner as described below. Firstly, 34.9 parts of copper sulfate, 44 parts of manganese sulfate, and 18.3 parts of cobalt sulfate were dissolved in 300 parts of water for dissolution to prepare an aqueous solution of mixed salts. As a precipitant, 42.6 parts of caustic soda was dissolved in 320 parts of water for dissolution to prepare an aqueous alkaline solution. Subsequently, these aqueous solutions were dropped under stirring into 270 parts of water for precipitation prepared in advance, and the pH after the dropping was adjusted to 12.5 to prepare a precursor of the intended particulate powder of the complex oxide of Co, Mn, and Cu. In preparing the precursor, 24 parts of hydrogen peroxide diluted to 35% was added for accelerating the oxidation in the liquid phase. The obtained precursor was washed with water and dried to be subjected to a heat treatment at 300° C., thereby obtaining the intended complex oxide of Co, Mn, Cu. The obtained complex oxide of Co, Mn, and Cu was an ultrafine particulate powder having a particle diameter of 0.05 μm and a specific surface area of 260 m$^2$/g.

The particulate powder of the oxide of Co used for Sample-B was prepared in the manner as described below.

Firstly, an aqueous solution of cobalt sulfate in which 56.8 parts of cobalt sulfate was dissolved in 100 parts of water for dissolution was prepared. Next, an aqueous alkaline solution in which 25 parts of soda ash was dissolved as a precipitant in 100 parts of water for dissolution was prepared. Subsequently, these aqueous solutions were dropped under stirring into 210 parts of water for precipitation prepared in advance, and the pH after the dropping was adjusted to 7 to prepare a precursor of the intended oxide of Co. The obtained precursor of the oxide of Co was then washed with water and dried to be subjected to a heat treatment at 300° C., thereby obtaining the intended ultrafine particle of the oxide of Co. The obtained ultrafine particle of the oxide of Co had a particle diameter of 0.02 μm and a specific surface area of 130 m$^2$/g.

As the packed bed 3, a packed bed having a diameter of 60 cm and a height of 30 cm was used, and 80 L of each of the above-described Samples-A to C each being the packing material 4 was packed therein to conduct tests. Specifically, the flow channel 6 in which ozone (maximum of 500 g/h) generated by the ozone generator 5 flows was connected to the flow channel 2 to inject and mix an ozone gas having a concentration shown in Table 2 into an exhaust gas containing MEK in a concentration shown in Table 2, the exhaust gas flowing in the flow channel 2, and the resultant mixed gas was supplied into each packed bed 3 having a different packing material to conduct decomposition treatment tests. It is to be noted that the superficial velocity of the packed bed is 1 m/sec, and the SV value of the packed bed was 10000 [1/h].

The exhaust gas after the oxidative decomposition by ozone comes out of the packed bed 3 to flow through a flow channel 7, and therefore the exhaust gas was collected with a branched collection line 8 and analyzed to evaluate the decomposition state. Specifically, the concentration of reaction products, the concentration of unreacted ozone, and the concentration of unreacted MEK in the exhaust gas after the decomposition treatment were measured to verify the effectiveness of the decomposition treatment method according to the present invention. In Table 1, the test apparatus, the range of the test condition, and the types of the packing materials used for the verification are shown together.

TABLE 1

Outline of test apparatus and test conditions

Characteristics of gases and supply condition

| | |
|---|---|
| Amount of exhaust gas at inlet port [m$^3$N/h] | 250 to 5000 |
| Concentration of MEK contained in exhaust gas [ppm] | 25, 2.50, 0.25 |
| MEK concentration in terms of C1 [ppm] | 100, 10, 1 |
| Ratio of O$_3$/VOC [O$_3$-ppm/VOC-ppm in terms of C1] | 0.8 to 10 |
| O$_3$ generator [m$^3$N/h] | 2.5 |
| [g/h] | 500 |

Constitution of packed bed

| | | |
|---|---|---|
| Height of packed bed [m] | | 0.3 |
| Diameter of packed bed φ [m] | | 0.6 |
| Volume of packed porous body [m$^3$] | | 0.08 |
| Type of packing material [specific surface area] | Sample-A [260 m$^2$/g] | 1: Oxide of Co, Mn, and Cu is carried |
| | Sample-B [130 m$^2$/g] | 2: Oxide of Co is carried |
| | Sample-C | 3: Ultra-stable Y type zeolite |

Tests of oxidative decomposition of MEK in the exhaust gases by ozone were conducted for the various types of constitution described above. In conducting the tests, (1) the ratio of the amount of a gas at the inlet port/the volume of the packed bed (SV value [1/hr]), (2) the MEK concentration (in terms of C1) and the ozone concentration at the inlet port, and (3) the ratio of the ozone concentration at the inlet port to the MEK concentration (in terms of C1) at the inlet port were changed as shown in Table 2.

TABLE 2

Characteristics of gases and conditions on amounts of gases for tests of oxidative decomposition by ozone Amounts of gases at inlet port, etc.

| Test condition | Exhaust gas Amount of gas m$^3$N/h | SV value 1/hr | MEK concentration ppm | MEK concentration ppm in terms of C1 | Ozone concentration ppm | Amount of ozone m$^3$N/h | Amount of ozone kg/h | Ratio of O$_3$/MEK (in terms of C1) O$_3$-ppm/MEK-ppm |
|---|---|---|---|---|---|---|---|---|
| 1 | 5000 | 58976 | 25 | 100 | 100 | 0.5 | 1.07 | 1.0 |
| 2 | 2500 | 29488 | 25 | 100 | 100 | 0.25 | 0.54 | 1.0 |
| 3 | 1000 | 11795 | 25 | 100 | 100 | 0.1 | 0.21 | 1.0 |
| 4 | 500 | 5898 | 25 | 100 | 100 | 0.05 | 0.11 | 1.0 |
| 5 | 250 | 2949 | 25 | 100 | 100 | 0.025 | 0.05 | 1.0 |
| 6 | 1000 | 11795 | 25 | 100 | 125 | 0.125 | 0.27 | 1.3 |

TABLE 2-continued

Characteristics of gases and conditions on amounts of gases for tests of oxidative decomposition by ozone
Amounts of gases at inlet port, etc.

| | | | Exhaust gas | | Ozone | | | Ratio of $O_3$/MEK |
|---|---|---|---|---|---|---|---|---|
| | Amount | SV | MEK concentration | | | | | |
| Test | of gas | value | | ppm in terms | concentration | Amount of ozone | | (in terms of C1) |
| condition | $m^3N/h$ | 1/hr | ppm | of C1 | ppm | $m^3N/h$ | kg/h | $O_3$-ppm/MEK-ppm |
| 7 | 1000 | 11795 | 25 | 100 | 100 | 0.1 | 0.21 | 1.0 |
| 8 | 1000 | 11795 | 25 | 100 | 90 | 0.09 | 0.19 | 0.9 |
| 9 | 1000 | 11795 | 25 | 100 | 80 | 0.08 | 0.17 | 0.8 |
| 10 | 1000 | 11795 | 25 | 100 | 100 | 0.1 | 0.21 | 1.0 |
| 11 | 2100 | 24770 | 2.5 | 10 | 10 | 0.021 | 0.05 | 1.0 |
| 12 | 4200 | 49540 | 0.25 | 1 | 10 | 0.042 | 0.09 | 10.0 |

MEK in the gases was subjected to oxidative decomposition by ozone using the apparatus illustrated in FIG. 1 in which Sample-A, Sample-B, and Sample-C were used as the packing material under the conditions on respective gases at the inlet port shown in Table 2. The oxidative decomposition of MEK in the gases by ozone was evaluated by the flow-through ratio of MEK (ratio of MEK concentration at outlet port/MEK concentration at inlet port), (A), and the flow-through ratio of ozone (ratio of ozone concentration at outlet port/ozone concentration at inlet port), (B), after the treatment. In Tables 3-a and b, the test results for the systems each using Sample-A and Sample-B respectively as the packing material are shown, and in Table 3-c, the test results for the system using Sample-C for comparison as the packing material are shown. Evaluation was conducted according to the criteria described below, and the evaluation results are shown in Table 3-a, Table 3-b, and Table 3-c.

(Evaluation Criteria)

Excellent: both flow-through ratio of MEK and flow-through ratio of ozone at outlet port are less than 5%

Good: both flow-through ratio of MEK and flow-through ratio of ozone at outlet port are 5% or more and less than 25%

Fair: both flow-through ratio of MEK and flow-through ratio of ozone at outlet port are 25% or more and less than 50%

Poor: both flow-through ratio of MEK and flow-through ratio of ozone at outlet port are 50% or more TABLE 3-a Study results for Sample-A

| | Outline of gases at inlet port | | | | | Amounts of gases, etc. at outlet port | | | | |
|---|---|---|---|---|---|---|---|---|---|---|
| Test condition | Amount of gas $m^3N/h$ | SV value 1/hr | MEK conc. ppm | Ozone conc. ppm | Ratio of $O_3$/MEK | MEK conc. ppm | Ozone conc. ppm | Flow-through ratio of MEK % | Flow-through ratio of ozone % | Evaluation |
| 1 | 5000 | 58976 | 100 | 100 | 1.0 | 36.0 | 32.4 | 36.0 | 32.4 | Fair |
| 2 | 2500 | 29488 | 100 | 100 | 1.0 | 18.0 | 16.2 | 18.0 | 16.2 | Good |
| 3 | 1000 | 11795 | 100 | 100 | 1.0 | 4.0 | 3.6 | 4.0 | 3.6 | Excellent |
| 4 | 500 | 5898 | 100 | 100 | 1.0 | 2.0 | 1.8 | 2.0 | 1.8 | Excellent |
| 5 | 250 | 2949 | 100 | 100 | 1.0 | 1.2 | 1.1 | 1.2 | 1.1 | Excellent |
| 6 | 1000 | 11795 | 100 | 125 | 1.3 | 4.0 | 3.6 | 4.0 | 2.9 | Excellent |
| 7 | 1000 | 11795 | 100 | 100 | 1.0 | 4.0 | 3.6 | 4.0 | 3.6 | Excellent |
| 8 | 1000 | 11795 | 100 | 90 | 0.9 | 10.0 | 0.5 | 10.0 | 0.6 | Good |
| 9 | 1000 | 11795 | 100 | 80 | 0.8 | 20.0 | 0.3 | 20.0 | 0.4 | Good |
| 10 | 1000 | 11795 | 100 | 100 | 1.0 | 4.0 | 3.6 | 4.0 | 3.6 | Excellent |
| 11 | 2100 | 24770 | 10 | 10 | 1.0 | 4.0 | 0.3 | 4.0 | 3.0 | Excellent |
| 12 | 4200 | 49540 | 1 | 10 | 10.0 | 4.0 | 0.3 | 4.0 | 3.0 | Excellent |

(*) conc.; concentration

TABLE 3-b

Study results for Sample-B

| | Outline of amounts of gases at inlet port | | | | | Amounts of gases, etc. at outlet port | | | | |
|---|---|---|---|---|---|---|---|---|---|---|
| Test condition | Amount of gas $m^3N/h$ | SV value 1/hr | MEK conc. ppm | Ozone conc. ppm | Ratio of $O_3$/MEK | MEK conc. ppm | Ozone conc. ppm | Flow-through ratio of MEK % | Flow-through ratio of ozone % | Evaluation |
| 1 | 5000 | 58976 | 100 | 100 | 1.0 | 43.2 | 38.9 | 43.2 | 38.9 | Fair |
| 2 | 2500 | 29488 | 100 | 100 | 1.0 | 21.6 | 19.4 | 21.6 | 19.4 | Good |
| 3 | 1000 | 11795 | 100 | 100 | 1.0 | 4.8 | 4.3 | 4.8 | 4.3 | Excellent |
| 4 | 500 | 5898 | 100 | 100 | 1.0 | 2.4 | 2.2 | 2.4 | 2.2 | Excellent |

TABLE 3-b-continued

Study results for Sample-B

| | Outline of amounts of gases at inlet port | | | | | Amounts of gases, etc. at outlet port | | | | |
|---|---|---|---|---|---|---|---|---|---|---|
| Test condition | Amount of gas m³N/h | SV value 1/hr | MEK conc. ppm | Ozone conc. ppm | Ratio of O₃/MEK | MEK conc. ppm | Ozone conc. ppm | Flow-through ratio of MEK % | Flow-through ratio of ozone % | Evaluation |
| 5 | 250 | 2949 | 100 | 100 | 1.0 | 1.4 | 1.3 | 1.4 | 1.3 | Excellent |
| 6 | 1000 | 11795 | 100 | 125 | 1.3 | 4.8 | 4.3 | 4.8 | 3.5 | Excellent |
| 7 | 1000 | 11795 | 100 | 100 | 1.0 | 4.8 | 4.3 | 4.8 | 4.3 | Excellent |
| 8 | 1000 | 11795 | 100 | 90 | 0.9 | 12.0 | 0.5 | 12.0 | 0.6 | Good |
| 9 | 1000 | 11795 | 100 | 80 | 0.8 | 24.0 | 0.3 | 24.0 | 0.4 | Good |
| 10 | 1000 | 11795 | 100 | 100 | 1.0 | 4.8 | 4.3 | 4.8 | 4.3 | Excellent |
| 11 | 2100 | 24770 | 10 | 10 | 1.0 | 4.8 | 0.3 | 4.8 | 3.0 | Excellent |
| 12 | 4200 | 49540 | 1 | 10 | 10.0 | 4.8 | 0.3 | 4.8 | 3.0 | Excellent |

(*) conc.; concentration

TABLE 3-c

Study results for Sample-C

| | Outline of amounts of gases at inlet port | | | | | Amounts of gases, etc. at outlet port | | | | |
|---|---|---|---|---|---|---|---|---|---|---|
| Test condition | Amount of gas m³N/h | SV value 1/hr | MEK conc. ppm | Ozone conc. ppm | Ratio of O₃/MEK | MEK conc. ppm | Ozone conc. ppm | Flow-through ratio of MEK % | Flow-through ratio of ozone % | Evaluation |
| 1 | 5000 | 58976 | 100 | 100 | 1.0 | 72.0 | 64.8 | 72.0 | 64.8 | Poor |
| 2 | 2500 | 29488 | 100 | 100 | 1.0 | 36.0 | 32.4 | 36.0 | 32.4 | Fair |
| 3 | 1000 | 11795 | 100 | 100 | 1.0 | 12.0 | 10.8 | 12.0 | 10.8 | Good |
| 4 | 500 | 5898 | 100 | 100 | 1.0 | 8.0 | 7.2 | 8.0 | 7.2 | Good |
| 5 | 250 | 2949 | 100 | 100 | 1.0 | 6.0 | 5.4 | 6.0 | 5.4 | Good |
| 6 | 1000 | 11795 | 100 | 125 | 1.3 | 15.0 | 13.5 | 15.0 | 10.8 | Good |
| 7 | 1000 | 11795 | 100 | 100 | 1.0 | 12.0 | 10.8 | 12.0 | 10.8 | Good |
| 8 | 1000 | 11795 | 100 | 90 | 0.9 | 40.0 | 0.5 | 40.0 | 0.6 | Fair |
| 9 | 1000 | 11795 | 100 | 80 | 0.8 | 60.0 | 0.3 | 60.0 | 0.4 | Poor |
| 10 | 1000 | 11795 | 100 | 100 | 1.0 | 12.0 | 10.8 | 12.0 | 10.8 | Good |
| 11 | 2100 | 24770 | 10 | 10 | 1.0 | 12.0 | 0.3 | 12.0 | 3.0 | Good |
| 12 | 4200 | 49540 | 1 | 10 | 10.0 | 12.0 | 0.3 | 12.0 | 3.0 | Good |

(*) conc.; concentration

As shown in Table 3-a describing the results of subjecting respective MEK-containing gases to oxidative decomposition by ozone using Sample-A being the packing material in which the ultrafine particulate powder of the complex oxide having a specific surface area of 260 m²/g, comprising Co, Mn, and Cu, and being prepared by the coprecipitation method is carried, and in Table 3-b describing the results of subjecting respective MEK-containing gases to oxidative decomposition by ozone using Sample-B being the packing material in which the ultrafine particle of the oxide of Co having a specific surface area of 130 m²/g and being prepared by the coprecipitation method is carried, in any of the cases, the flow-through ratio of MEK (ratio of MEK concentration at outlet port/MEK concentration at inlet port) and the flow-through ratio of ozone (ratio of ozone concentration at outlet port/ozone concentration at inlet port) after the treatment are outstandingly smaller than those in the cases shown in Table 3, wherein Sample-C in which a fine particle is not carried was used as the packing material, and it was found that efficient oxidative decomposition by ozone was performed, and thus a remarkable effect brought about by the constitution according to the present invention was ascertained. Hereinafter, description will be made on the remarkable effect in detail.

(Dependence on Amount of Gas at Inlet Port)

As shown in the test conditions 1 to 5, when the amount of the gas at the inlet port is changed from 5000 m³N/h to 250 m³N/h, the SV value is lowered to about 60000 to about 3000 [1/hr]. In this case, the flow-through ratio of MEK was decreased from 36% to 1.2% in the system where Sample-A was used as the packing material as shown in Table 3-a. In addition, the flow-through ratio of MEK was changed from 43% to 1.4% in the system where Sample-B was used as the packing material as shown in Table 3-b. In contrast, in the cases of Sample-C in which the ultra-stable Y type zeolite carrying nothing thereon was used, the flow-through ratio of MEK was changed from 64.8% to 5.4% as shown in Table 3-c. From these results, it was found that the system where the packing material (Sample-A) in which the ultrafine particle of the complex oxide comprising Co, Mn, and Cu is carried was used exhibits the most excellent decomposition performance, and is followed by the system where the packing material (Sample-B) in which the ultrafine particle of the oxide of Co is carried was used, but in contrast, the performance of the USY (Sample-C) was considerably lower than that of Sample-A and of Sample-B.

(Dependence on Amount of Ozone Injected)

The tests were conducted changing the amount of ozone injected between 0.27 and 0.17 kg/h so that the ratio of the ozone concentration at the inlet port/the MEK concentration at the inlet port (in terms of C1) was changed between 1.3 to 0.8 as shown in the test conditions 6 to 9. As a result, the flow-through ratio of MEK was increased from 4% to 20% for Sample-A as shown in Table 3-a and from 4.8% to 24% for Sample-B. From these results, it was ascertained that it is effective to adjust the amount of ozone injected so that the ratio of the ozone concentration at the inlet port/the MEK concentration at the inlet port (in terms of C1) is kept to be preferably 0.9, more preferably 1.0 although the effect is obtained when the ratio exceeds 0.8, and that the flow-through ratio of MEK of 5% or less can be achieved by the injection of ozone that satisfies the ratio of the ozone concentration at the inlet port/the MEK concentration at the inlet port (in terms of C1)≥1 according to the MEK concentration in terms of C1. The performance of decomposing MEK herein was also in the order of Sample-A, Sample-B, and Sample-C with Sample-A being the highest, and in the system where Sample-C was used as the packing material, the flow-through ratio of MEK could not be reduced to 10% or less even when the ratio of the ozone concentration at the inlet port/the MEK concentration at the inlet port (in terms of C1) was made to be 1.0, or further, 1.3 as shown in Table 3-c. From these results, the remarkable advantage of the performance of decomposing VOC or the like by ozone, which is brought about by carrying the particulate powder of the transition metal-containing oxide on the base material made of the high silica adsorbent specified in the present invention, was ascertained.

(Dependence on MEK Concentration)

The flow rate at the inlet port was adjusted by changing the MEK concentration at the inlet port (in terms of C1) between 100 ppm and 1 ppm as shown in the test conditions 10 to 12 so that the flow-through ratio of MEK achieved 5% or less. When Sample-A is taken as an example, the flow rate at the inlet port which can secure a flow-through ratio of MEK of 5% or less is about 1000 m$^3$N/h (SV 10000) at an MEK concentration of 100 ppm as shown in Table 3-a. When the MEK concentration is reduced to 10 ppm herein, the flow rate that can secure a flow-through ratio of MEK of 5% or less becomes about 2500 m$^3$N/h (SV=25000 [1/hr]), and when the MEK concentration is 1 ppm, a flow-through ratio of MEK of 5% or less can be achieved even if the amount of the gas at the inlet port is 5000 m$^3$N/h (SV=50000 [1/hr]). As can be understood from this, when the MEK concentration at the inlet port is reduced, the performance of decomposing MEK can be achieved at a larger SV value (smaller packed amount). As shown in Table 3-b, in the case where the packing material in which Sample-B is carried was used, the performance that is about as good as that in the case where Sample-A was used was also exhibited although the performance of Sample-B was slightly inferior to the performance of Sample-A. In contrast, as shown in Table 3-c, in the system where Sample-C was used as the packing material, the flow-through ratio of MEK could not be made to be 10% or less, to say nothing of 5% or less. From these results, the remarkable advantage of the performance of decomposing MEK, which is brought about by carrying the particulate powder of the transition metal-containing oxide on the base material made of the high silica adsorbent specified in the present invention, was ascertained.

(Versatility to Types of VOCS)

The amount of the gas at the inlet port was set at 1000 m$^3$N/h, the SV value was set at 12000 [1/h], the particulate powder of the complex oxide comprising Co, Mn, and Cu, which exhibited the best performance of decomposition by ozone in the previous treatment of MEK, was used as the particulate powder of a transition metal-containing oxide, and Sample-A in which the particulate powder is carried was used as the packing material. Oxidative decomposition tests with ozone were conducted by setting the ratio of the injected ozone concentration/the VOC concentration (in terms of C1) at 1.2, and changing the VOC as an object of the treatment from MEK to the substances (1) to (9) described below. The gas concentration of each VOC substance is expressed in terms of C1, and each value in the parenthesis denotes the concentration of a gas used.

(1) 100 ppm of ethyl acetate (in terms of C1), (25 ppm of ethyl acetate was used)

(2) 100 ppm of cyclohexanone (in terms of C1), (16.6 ppm of cyclohexanone was used)

(3) 100 ppm of toluene (in terms of C1), (14.3 ppm of toluene was used)

(4) 100 ppm of styrene (in terms of C1), (12.5 ppm of styrene was used)

(5) 100 ppm of xylene (in terms of C1), (12.5 ppm of xylene was used)

(6) 100 ppm of acetaldehyde (in terms of C1), (50 ppm of acetaldehyde was used.

(7) 50 ppm of propionaldehyde (in terms of C1), (16.6 ppm of propionaldehyde was used)

(8) 50 ppm of propionic acid (in terms of C1), (16.6 ppm of propionic acid was used)

(9) 150 ppm of acetic acid (in terms of C1), (75 ppm of acetic acid was used)

With respect to the results of the above-described tests, the flow-through ratio of each component (ratio of concentration at outlet port/concentration at inlet port for each component) was as follows to find that a good decomposition performance was exhibited for any of the components. That is, with respect to the results of the tests, the obtained flow-through ratio of each component was (1) 3% for ethyl acetate, (2) 6% for cyclohexanone, (3) 8% for toluene, (4) 6% for styrene, (5) 5% for xylene, (6) 15% for acetaldehyde, (7) 10% for propionaldehyde, (8) 4% for propionic acid, and (9) 3% for acetic acid.

(Application to Gas-Phase Inorganic Reducing Compounds)

The amount of the gas at the inlet port was set at 1000 m$^3$N/h, the SV value was set at 12,000 [1/h], the particulate powder of the complex oxide comprising Co, Mn, and Cu, which exhibited the best performance of decomposition by ozone in the previous treatment of MEK, was used as the particulate powder of a transition metal-containing oxide, and Sample-A in which the particulate powder is carried was used as the packing material. Oxidative decomposition tests with ozone were conducted by further setting the ratio of the injected ozone concentration/the gas-phase inorganic reducing compound concentration at 2, and changing the object of the treatment to the malodorous substances (11) to (15) described below.

The components as objects of the treatment were changed to (11) 100 ppm of ammonia, (12) 10 ppm of methyl mercaptan, (13) 100 ppm of trimethylamine, (14) 10 ppm of hydrogen sulfide, and (15) 10 ppm of carbon monoxide, and oxidative decomposition treatment with ozone was performed on these components. All the numerical values are expressed in terms of C1. With respect to the results of these tests, the obtained flow-through ratio of each component obtained was as follows to find that a good decomposition performance was exhibited for any of the components. That is, with respect to the results of the oxidative decomposition treatment tests, the obtained flow-through ratio of each component was 0.5% for ammonia (11), 1% for methyl mercaptan (12), 6% for trimethylamine (13), 1% for hydrogen sulfide (14), and 5% for carbon monoxide (15) to find that an extremely good decomposition performance was exhibited for any of the components. The above-described results show that a high treatment efficiency that has never been achieved by the conventional techniques can be realized even for the above-described malodorous components, which are reducing compounds to ozone, by applying the method according to the present invention.

INDUSTRIAL APPLICABILITY

According to the method for performing an oxidative decomposition treatment with ozone of the present invention, even in the case where components such as ethylene, aldehyde, and terpene to be a hindrance factor in performing a treatment of volatile organic compounds (VOCs) for which the emission regulation is being strengthened by Air Pollution Control Act, a treatment of malodorous components for which the emission regulation is being strengthened by Offensive Odor Control Act, and further, keeping freshness of agricultural crops, are contained in low concentrations in a high-flow rate gas, oxidative decomposition treatment with ozone on these components in the gas can be performed efficiently, and the amount of ozone to be used can be reduced, so that versatile application of the method for performing oxidative decomposition treatment with ozone of the present invention can be expected.

REFERENCE SIGNS LIST

1: Exhaust gas
2: Flow channel for exhaust gas
3: Packed bed (adsorption bed)
4: Packing material
5: Ozone generator
6: Flow channel for ozone
7: Flow channel for gas after treatment
8: Collection line

The invention claimed is:

1. A method for performing an oxidative decomposition treatment with ozone on a VOC and/or a gas-phase inorganic reducing compound in a gas, the method comprising
adding, or mixing, or adding and mixing an ozone-comprising gas into or with a gas comprising as a target component, a VOC, or a gas-phase inorganic reducing compound, or a combination thereof, and then
bringing a resultant mixed gas into contact with a packing material comprising as a base material, a silica adsorbent, which co-adsorbs the target component and ozone; and particulate powder of a transition metal-containing oxide, so that the target component is decomposed through ozone oxidation,
wherein in the packing material, the particulate powder of a transition metal-containing oxide has a BET specific surface area in a range of 80 m$^2$/g or more and is carried on the base material, and
the transition metal-containing oxide is a complex oxide of Co, Mn, and Cu.

2. The method for performing an oxidative decomposition treatment with ozone on a VOC and/or a gas-phase inorganic reducing compound in a gas according to claim 1,
wherein the transition metal-containing oxide is the complex oxide of Co, Mn, and Cu, and
the particulate powder of the complex oxide of Co, Mn, and Cu is formed of a precipitate obtained through co-precipitation performed by mixing an aqueous solution comprising salts of Co, Mn, and Cu, with an aqueous alkaline solution.

3. The method for performing an oxidative decomposition treatment with ozone on a VOC and/or a gas-phase inorganic reducing compound in a gas according to claim 1,
wherein when an exhaust gas comprising the target component is brought into contact with the ozone, a ratio of a concentration of the ozone injected into the exhaust gas relative to a concentration of the target component calculated on a C1 basis, in the exhaust gas is in a range of more than 0.8.

4. The method for performing an oxidative decomposition treatment with ozone on a VOC and/or a gas-phase inorganic reducing compound in a gas according to claim 1,
wherein the BET specific surface area is in a range of 100 m$^2$/g or more.

5. The method for performing an oxidative decomposition treatment with ozone on a VOC and/or a gas-phase inorganic reducing compound in a gas according to claim 1,
wherein the silica adsorbent comprises at least one material selected from the group consisting of a silica pentasil zeolite, a dealuminized faujasite, and a mesoporous silicate.

6. The method for performing an oxidative decomposition treatment with ozone on a VOC and/or a gas-phase inorganic reducing compound in a gas according to claim 1,
wherein the the target component is at least one material selected from the group consisting of ammonia, methyl mercaptan, hydrogen sulfide, methyl sulfide, trimethylamine, acetaldehyde, propionaldehyde, normal butyraldehyde, isobutyraldehyde, normal valeraldehyde, isovaleraldehyde, isobutanol, ethyl acetate, methyl isobutyl ketone, toluene, styrene, xylene, cyclohexanone, propionic acid, normal butyric acid, normal valeric acid, isovaleric acid, and carbon monoxide.

7. The method for performing an oxidative decomposition treatment with ozone on a VOC and/or a gas-phase inorganic reducing compound in a gas according to claim 1,
wherein the packing material consists of: the silica adsorbent as a base material; and the particulate powder of the transition metal-containing oxide.

* * * * *